(12) United States Patent
Lazarevic et al.

(10) Patent No.: US 9,928,225 B2
(45) Date of Patent: Mar. 27, 2018

(54) FORMULA DETECTION ENGINE

(75) Inventors: Milos Lazarevic, Belgrade (RS); Milos Raskovic, Belgrade (RS); Aljosa Obuljen, Belgrade (RS); Vanja Petrovic Tankovic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 939 days.

(21) Appl. No.: 13/521,318

(22) PCT Filed: Jan. 23, 2012

(86) PCT No.: PCT/EP2012/000285
§ 371 (c)(1),
(2), (4) Date: Jul. 10, 2012

(87) PCT Pub. No.: WO2013/110285
PCT Pub. Date: Aug. 1, 2013

(65) Prior Publication Data
US 2013/0205200 A1    Aug. 8, 2013

(51) Int. Cl.
*G06F 17/00*      (2006.01)
*G06F 17/22*      (2006.01)
(Continued)

(52) U.S. Cl.
CPC ..... *G06F 17/2264* (2013.01); *G06K 9/00463* (2013.01); *G06K 9/342* (2013.01);
(Continued)

(58) Field of Classification Search
CPC ........... G06F 17/2264; G06F 17/30253; G06F 17/30259; G06K 9/00463; G06K 9/342
See application file for complete search history.

(56) References Cited

U.S. PATENT DOCUMENTS

| 5,212,769 A | 5/1993 | Pong |
| 6,081,381 A | 6/2000 | Shalapenok et al. |

(Continued)

FOREIGN PATENT DOCUMENTS

| CN | 1834992 A | 9/2006 |
| CN | 101329731 A | 12/2008 |

(Continued)

OTHER PUBLICATIONS

Lin et al, "Mathematical Formula Identification in PDF Documents", Sep. 18-21, 2011, IEEE, 10 pages.*

(Continued)

*Primary Examiner* — Cesar Paula
*Assistant Examiner* — David Faber
(74) *Attorney, Agent, or Firm* — Merchant & Gould P.C.

(57) ABSTRACT

A formula detection engine and associated method. The formula detection engine locates formulas within a fixed format document portion by identifying formula seeds. The formula detection engine creates and expands a boundary around the formula seed to define a formula area. To eliminate overlap with surrounding normal text, the formula area is divided into multiple formula areas based on vertical position and horizontal spacing between the formula elements. After being vertically ordered, horizontally overlapping formula areas are merged to reconstruct the formula as a flowable element.

21 Claims, 11 Drawing Sheets

(51) Int. Cl.
*G06K 9/00* (2006.01)
*G06K 9/34* (2006.01)
*G06F 17/30* (2006.01)

(52) U.S. Cl.
CPC .. *G06F 17/30253* (2013.01); *G06F 17/30259* (2013.01); *G06K 2209/01* (2013.01)

(56) References Cited

U.S. PATENT DOCUMENTS

| | | | |
|---|---|---|---|
| 6,148,110 A | 11/2000 | Yajima et al. | |
| 6,370,269 B1 | 4/2002 | Al-Karmi et al. | |
| 6,525,749 B1 | 2/2003 | Moran et al. | |
| 6,915,484 B1 | 7/2005 | Ayers et al. | |
| 7,181,068 B2 | 2/2007 | Suzuki et al. | |
| 7,561,737 B2 | 7/2009 | Zou et al. | |
| 7,853,869 B2 | 12/2010 | Gurcan et al. | |
| 8,064,696 B2 | 11/2011 | Radakovic et al. | |
| 8,209,600 B1* | 6/2012 | Koh | G06F 17/2264 715/244 |
| 8,249,356 B1 | 8/2012 | Smith | |
| 8,271,873 B2 | 9/2012 | El-Shishiny et al. | |
| 8,280,892 B2 | 10/2012 | Marvit et al. | |
| 8,559,718 B1 | 10/2013 | Chulinin | |
| 8,942,489 B2 | 1/2015 | Sesum et al. | |
| 9,330,070 B2 | 5/2016 | Zaric et al. | |
| 9,460,089 B1 | 10/2016 | Rathod | |
| 2002/0126905 A1 | 9/2002 | Suzuki et al. | |
| 2004/0093355 A1* | 5/2004 | Stinger | G06F 17/2247 |
| 2004/0105583 A1 | 6/2004 | Jacobs | |
| 2004/0194028 A1 | 9/2004 | O'Brien | |
| 2005/0183033 A1 | 8/2005 | Feinberg et al. | |
| 2005/0251735 A1 | 11/2005 | Dunietz et al. | |
| 2006/0001667 A1 | 1/2006 | LaViola et al. | |
| 2006/0062469 A1 | 3/2006 | Li et al. | |
| 2006/0210195 A1 | 9/2006 | Ohguro | |
| 2007/0002054 A1 | 1/2007 | Bronstein | |
| 2007/0009161 A1 | 1/2007 | Hollingsworth | |
| 2007/0136660 A1 | 6/2007 | Gurcan et al. | |
| 2009/0304282 A1* | 12/2009 | Predovic | G06K 9/00422 382/187 |
| 2009/0304283 A1* | 12/2009 | Predovic | G06K 9/00436 382/189 |
| 2010/0174985 A1 | 7/2010 | Levy et al. | |
| 2011/0115796 A1 | 5/2011 | Murrett et al. | |
| 2011/0222771 A1* | 9/2011 | Cimpoi | G06K 9/00463 382/176 |
| 2011/0289395 A1* | 11/2011 | Breuel | G06F 17/211 715/205 |
| 2012/0039536 A1* | 2/2012 | Dejean | G06K 9/03 382/176 |
| 2012/0102393 A1 | 4/2012 | Kutsumi et al. | |
| 2012/0107779 A1 | 5/2012 | Halton et al. | |
| 2012/0185766 A1 | 7/2012 | Mansfield et al. | |
| 2012/0185788 A1 | 7/2012 | Fong et al. | |
| 2013/0067313 A1* | 3/2013 | Leguin | G06F 17/21 715/234 |
| 2013/0124953 A1* | 5/2013 | Fan | G06F 17/212 715/202 |
| 2013/0174017 A1 | 7/2013 | Richardson et al. | |
| 2014/0108897 A1 | 4/2014 | Boutelle et al. | |
| 2014/0258852 A1 | 9/2014 | Sesum et al. | |
| 2016/0246774 A1 | 8/2016 | Zaric et al. | |

FOREIGN PATENT DOCUMENTS

| | | | |
|---|---|---|---|
| CN | 101796509 A | 8/2010 | |
| CN | 102375988 A | 3/2012 | |
| CN | 102411707 A | 4/2012 | |
| CN | 102782703 A | 11/2012 | |
| EP | 1703444 A2 | 9/2006 | |
| JP | 62057069 A | 3/1987 | |
| JP | H11259477 A | 9/1999 | |
| JP | 2002269499 A | 9/2002 | |
| JP | 2003256679 A | 9/2002 | |
| JP | 2003256769 A | 9/2003 | |
| KR | 1020080053930 A | 6/2008 | |
| RU | 2421810 C2 | 6/2011 | |
| TW | 200519637 A | 6/2005 | |
| WO | 2009030577 A2 | 3/2009 | |
| WO | 2013110285 A1 | 8/2013 | |

OTHER PUBLICATIONS

Lin et al, "Identification of embedded mathematical formulas in PDF documents using SVM", publicly available on Google since Dec. 22, 2011; created Nov. 11, 2011, 8 pages + 3 pages showing evidence being publicly on Google since Dec. 22, 2011 and the creation date of the document (11 pages total).*

Lin, et al., "Mathematical Formula Identification in PDF Documents.", In International Conference on Document Analysis and Recognition, Sep. 18, 2011, 5 pages.

Eto, et al., "Mathematical Formula Recognition Using Virtual Link Network.",In Proceedings of Sixth International Conference on Document Analysis and Recognition, Sep. 10, 2001, 6 pages.

Kacem, et al., "Automatic extraction of printed mathematical formulas using fuzzy logic and propagation of contextpsdoc", International Journal on Document Analysis and Recognition (Springer Heidelberg, DE, Jan. 2001), pp. 97-108.

Jianming, et al., "Mathematical formulas extraction", in: Proceedings of Seventh International Conference on Document Analysis and Recognition (Piscataway, NJ, Aug. 3-6, 2003) pp. 1138-1141.

Chowdhury et al., "Automated segmentation of math-zones from document images", in: Proceedings of Seventh International Conference on Document Analysis and Recognition (Piscataway, NJ, Aug. 3-6, 2003) pp. 755-759.

International Search Report and Written Opinion of the International Searching Authority, dated Oct. 10, 2012, 12 pages.

"Notice of Allowance Issued in Russian Patent Application No. 2014130243", dated Dec. 28, 2015, 21 Pages. (with English Translation).

"Office Action Issued in Japanese Patent Application No. 2014-553619", dated Nov. 24, 2015, 6 Pages.

"Office Action Issued in Chinese Patent Application No. 201280067895.X", dated Aug. 24, 2016, 9 Pages.

"Unicode Character Property—Wikipedia", Old Revision of Wikipedia, https://en.wikipedia.org/w/index.php?title=unicode_character_propert&oldid=539206458, Feb. 20, 2013, pp. 47.

"Welcome to TrueType Oven", http://www.microosft.com/typography/tt/tt_open/msdn/ttoch01.doc, Mar. 1995, 8 pages.

Australian Notice of Allowance in Application 2012367116, dated Jun. 8, 2017, 3 pages.

Chinese Notice of Allowance in Application 201280067895.X, dated Jan. 18, 2017, 4 pages.

Chowdhury et al., "Automated Segmentation of Math-Zones from Document Images", Proceedings of the 7th International Conference on Document Analysis and Recognition, Piscataway, NJ, USA, IEEE, 2003, 5 pages.

Davis, "Unicode Standard Annex #9—Unicode Bidirectional Algorithm", Internet Citation, http://unicode.org/reports/tr9, Sep. 27, 2010, 30 pages.

Etemad, "Robust Vertical Text Layout", In Proceedings of 27th Internationalization and Unicode Conference, Berlin, Germany, Apr. 2005, 26 pages.

Gidali, "Complex—Text Languages—An Overview", http://www.opengroup.org/onlinepubs/9638399/overview.htm, 1997, 26 pages.

Hssini et al., "Problem of multiple Diacritics Design for Arabic Script", IOSR Journal of Engineering, Dec. 2012, pp. 48-53.

Jin et al., "Mathematical Formulas Extraction", Proceedings of the 7th International Conference on Document Analysis and Recognition, Piscataway, NJ, USA, IEEE, 2003, 4 pages.

Lemberg, "Unicode Support in the CJK Package", In Proceedings of the Asian Journal of TEX, vol. 2, No. 1, Apr. 2008, 3 pages.

Liang et al., "Document layout structure extraction using bounding boxes of different entitles", Third IEEE Workshop on applications on Computer Vision, 1996, pp. 278-283.

(56) References Cited

OTHER PUBLICATIONS

Marshall, "East Asian Text Layout Features in Office 2010", http://blogs.technet.com/b/office_global_experience/archive/2010/03/25/east-asian-text-layout-features-in-office-2010.aspx, Mar. 24, 2010, 4 pages.
PCT International Preliminary Report on Patentability in PCT/EP2012/000285, dated Jul. 29, 2014, 7 pages.
Poirier et al., "An Interactive system to extract structured text from a geometrical representation", Proceedings of the 4th International Conference on Document Analysis and Recognition, 1997, pp. 342-346.
Suignard, "CSS3 Text Extensions", In Proceedings of Eighteenth International Unicode Conference, Hongkong, Apr. 2001, 16 pages.

* cited by examiner

FORMULA DETECTION ENGINE

CROSS REFERENCE TO RELATED APPLICATIONS

This application is a National Stage of International Application No. PCT/EP2012/000285, filed Jan. 23, 2012.

BACKGROUND

Flow format documents and fixed format documents are widely used and have different purposes. Flow format documents organize a document using complex logical formatting structures such as sections, paragraphs, columns, and tables. As a result, flow format documents offer flexibility and easy modification making them suitable for tasks involving documents that are frequently updated or subject to significant editing. In contrast, fixed format documents organize a document using basic physical layout elements such as text runs, paths, and images to preserve the appearance of the original. Fixed format documents offer consistent and precise format layout making them suitable for tasks involving documents that are not frequently or extensively changed or where uniformity is desired. Examples of such tasks include document archival, high-quality reproduction, and source files for commercial publishing and printing. Fixed format documents are often created from flow format source documents. Fixed format documents also include digital reproductions (e.g., scans and photos) of physical (i.e., paper) documents.

In situations where editing of a fixed format document is desired but the flow format source document is not available, the fixed format document must be converted into a flow format document. Conversion involves parsing the fixed format document and transforming the basic physical layout elements from the fixed format document into the more complex logical elements used in a flow format document. Existing document converters faced with complex elements, such as mathematical formulas and expressions, resort to base techniques designed to preserve visual fidelity of the layout of the fixed format document (e.g., text frames, line spacing, character spacing, and images) at the expense of the flowability of the output document. The result is a limited flow format document that requires the user to perform substantial manual reconstruction to have a truly useful flow format document. It is with respect to these and other considerations that the present invention has been made.

BRIEF SUMMARY

The following Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

One embodiment of the formula detection engine executes the associated formula detection method as part of the conversion process transforming a fixed format document into a flow format document. The formula detection engine creates the initial formula areas by identifying elements that are potentially part of a mathematical formula and grouping those elements into formula areas based on the relative position of those elements. The formula detection engine begins by identifying formula seeds in the parsed elements. A formula seed is a text element that carries some indication of being part of a formula, such as text runs written in fonts used exclusively, or almost exclusively, to display mathematical expressions and mathematical operators, symbols, or keywords, which are exclusively, or almost exclusively, used in mathematical formulas. Once the formula seeds are identified, the formula detection engine defines a formula area (i.e., a boundary) around each of the detected formula seeds and expands the boundaries to group the formula seeds and other elements based on proximity. All of the page elements enclosed by the bounding box of the formula area are deemed to be the captured elements.

Next, the formula detection engine eliminates overlap between the formula areas and any surrounding normal text (i.e., textual elements that are not part of a mathematical formula) by subdividing formula areas overlapping normal text based on vertical position and splitting the formula areas based on horizontal spacing. The formula detection engine begins by analyzing each formula area to determine whether or not the formula area overlaps any areas of normal text. If the formula area overlaps any normal text, the formula detection engine divides the formula area by grouping the captured elements based on vertical position. A new formula area is created around each group of captured elements. The formula detection engine analyzes the contents of new formula areas for overlap with normal text, and, any new formula area still containing normal text are further divided. Once the formula areas are divided, the formula detection engine splits each formula area according to the horizontal spacing between the captured elements.

Finally, the formula detection engine reconstructs the mathematical formulas as flowable elements by merging any neighboring formula areas based on proximity. The formula detection engine uses the information about the positions of the neighboring text elements to prevent merging of formula areas appearing in different lines on a page. Formula areas that overlap horizontally (i.e., are at least partially vertically aligned) and are within a selected vertical separation distance are grouped as merge candidates. The formula detection engine orders (e.g., sorts) the merge candidates according to the vertical separation between the formula areas and replaces the two formula areas of the merge candidate with a new formula area, provided that the two formula areas have not already been merged and are not in separate lines.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Further features, aspects, and advantages will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

A formula detection engine and associated method for identifying mathematical formulas and expressions in data extracted from a fixed format document is described herein and illustrated in the accompanying figures. The formula detection engine locates formulas within the fixed format document portion by identifying a formula seed. The formula detection engine creates and expands a boundary around the formula seed to define a formula area. To eliminate overlap with surrounding normal text, the formula area is divided into multiple formula areas based on vertical position and horizontal spacing between the captured elements. The resulting formula areas vertically ordered and horizontally overlapping formula areas are merged to reconstruct the formula as a flowable element.

Figure 1:
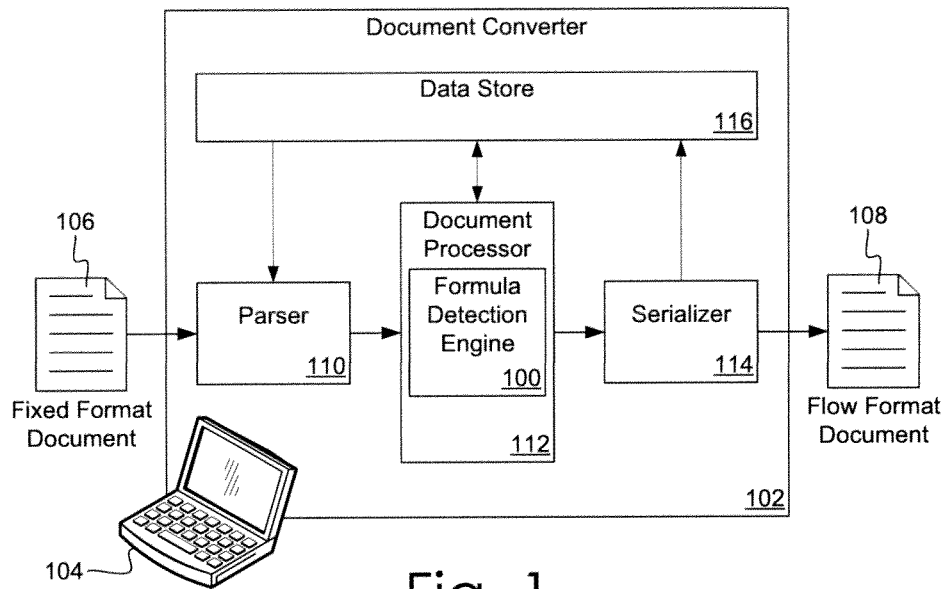
FIG. 1 illustrates a system including the formula detection engine.

FIG. 1 illustrates one embodiment of a system incorporating the formula detection engine 100. In the illustrated embodiment, the formula detection engine 100 operates as part of a document converter 102 executed on a computing device 104. The document converter 102 converts a fixed format document 106 into a flow format document 108 using a parser 110, a document processor 112, and a serializer 114. The parser 110 reads and extracts data from the fixed format document 106. The data extracted from the fixed format document is written to a data store 116 accessible by the document processor 112 and the serializer 114. The document processor 112 analyzes and transforms the data into flowable elements using one or more detection and/or reconstruction engines (e.g., the formula detection engine 100 of the present invention). Finally, the serializer 114 writes the flowable elements into a flowable document format (e.g., a word processing format).

Figure 2:
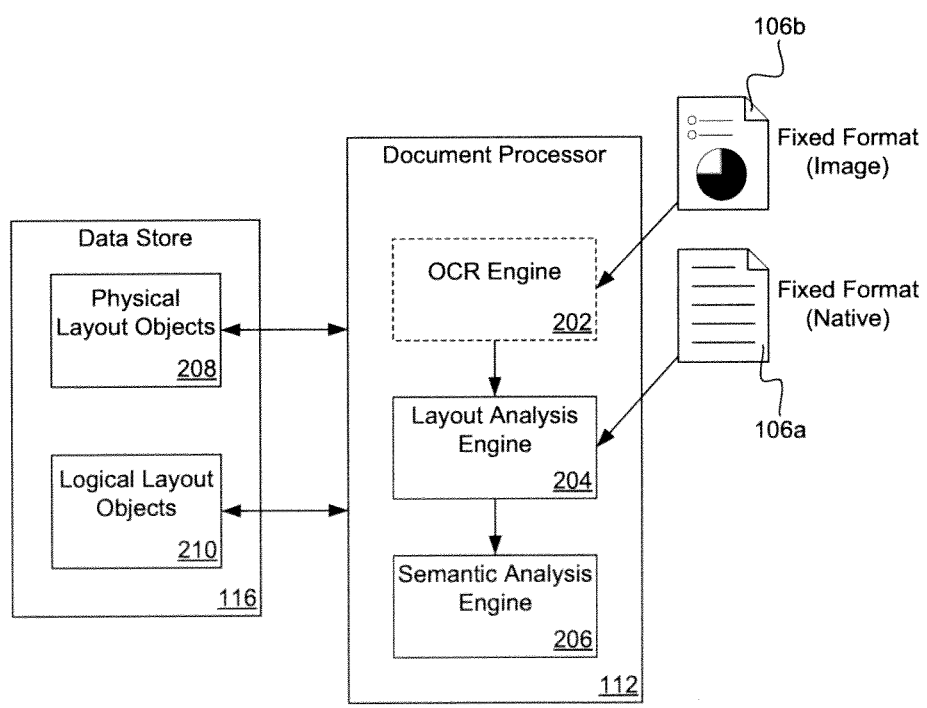
FIG. 2 is a block diagram showing the operational flow of one embodiment of the document processor.

FIG. 2 illustrates one embodiment of the operational flow of the document processor 112 in greater detail. The document processor 112 includes an optional optical character recognition (OCR) engine 202, a layout analysis engine 204, and a semantic analysis engine 206. The data contained in the data store 116 includes physical layout objects 208 and logical layout objects 210. In some embodiments, the physical layout objects 208 and logical layout objects 210 are hierarchically arranged in a tree-like array of groups (i.e., data objects). In various embodiments, a page is the top level group for the physical layout objects 208, while a section is the top level group for the logical layout objects 210. The data extracted from the fixed format document 106 is generally stored as physical layout objects 208 organized by the containing page in the fixed format document 106. The basic physical layout objects include text-runs, images, and paths. Text-runs are the text elements in page content streams specifying the positions where characters are drawn when displaying the fixed format document. Images are the raster images (i.e., pictures) stored in the fixed format document 106. Paths describe elements such as lines, curves (e.g., cubic Bezier curves), and text outlines used to construct vector graphics. Logical data objects include flowable elements such as sections, paragraphs, columns, and tables.

Where processing begins depends on the type of fixed format document 106 being parsed. A native fixed format document 106a created directly from a flow format source document contains the some or all of the basic physical layout elements. Generally, the data extracted from a native fixed format document. The embedded data structures are extracted by the parser and are available for immediate use by the document converter; although, in some instances, minor reformatting or other minor processor is applied to organize or standardize the data. In contrast, all information in an image-based fixed format document 106b created by digitally imaging a physical document (e.g., scanning or photographing) is stored as a series of page images with no additional data (i.e., no text-runs or paths). In this case, the optional optical character recognition engine 202 analyzes each page image and creates corresponding physical layout objects. Once the physical layout objects 208 are available, the layout analysis engine 204 analyzes the layout of the fixed format document. After layout analysis is complete, the semantic analysis engine 206 enriches the logical layout objects with semantic information obtained from analysis of the physical layout objects and/or logical layout objects.

Figure 3:
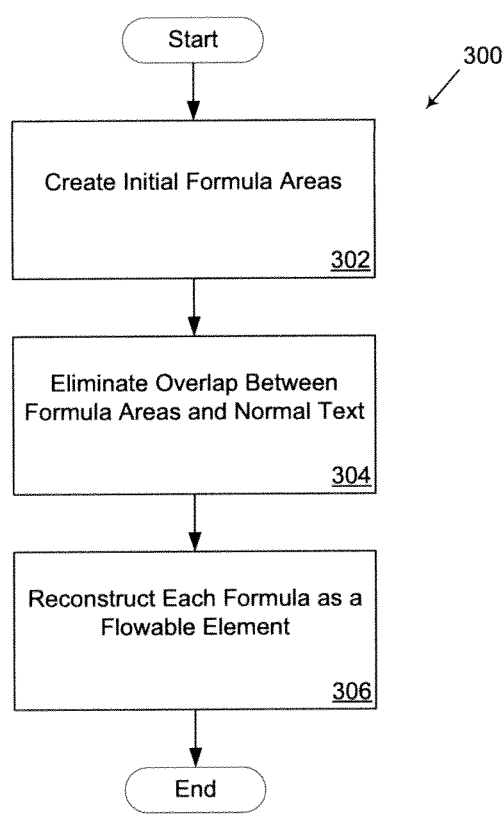
FIG. 3 is a flow chart showing one embodiment of the formula detection method.

FIG. 3 is a flow diagram showing one embodiment of the formula detection method 300 executed by the formula detection engine 100. The formula detection engine 100 creates 302 the initial formula areas by identifying elements in the physical layout objects that are potentially part of a mathematical formula and grouping those elements into formula areas based on the relative position of those elements. Next, the formula detection engine 100 eliminates 304 overlap between the formula areas and any surrounding normal text (i.e., textual elements that are not part of a mathematical formula) by subdividing formula areas overlapping normal text and splitting the formula areas based on horizontal spacing. Finally, the formula detection engine 100 reconstructs 306 the mathematical formulas as flowable elements by merging any neighboring formula areas based on proximity.

Figure 4:
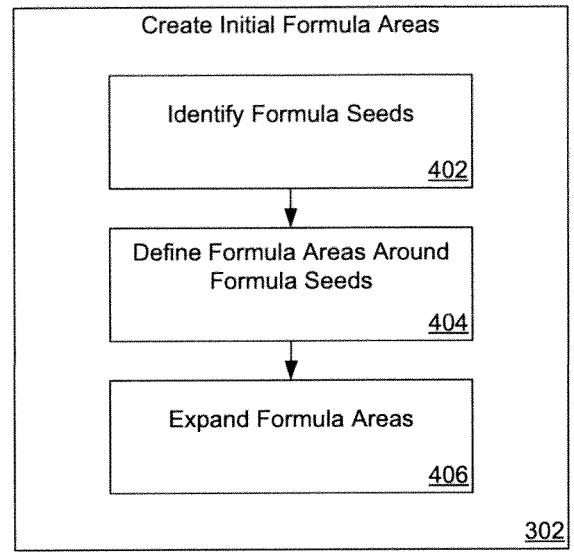
FIG. 4 is a flow chart showing one embodiment of the process for creating the initial formula areas used in the formula detection method.

FIG. 4 is a flow diagram showing one embodiment of the process of creating 302 the initial formula areas used in the formula detection method 300. The formula detection engine 100 begins by identifying 402 formula seeds in the parsed elements. Most generally, a formula seed is a text element that carries some indication of being part of a formula. To identify formula seeds, the formula detection engine 100 searches for one or more of the following, without limitation: text runs written in fonts used exclusively, or almost exclusively, to display mathematical expressions and mathematical operators, symbols, or keywords, which are exclusively, or almost exclusively, used in mathematical formulas.

For example, a word processor may represent formulas with a mathematics font such as Microsoft Corporation's Cambria® Math, while a document preparation system (e.g., LaTeX) may use multiple mathematics font families, such as the Computer Modern math fonts. The formula detection engine 100 also considers the presence of mathematical operators, symbols, and keywords to identify formula seeds because some document processors do not use any special mathematics fonts for mathematics. Examples of the mathematical operators, symbols, or keywords used for formula detection include operators such as "Σ" and "∓", symbols such as "n", and keywords such as "cos" representing the cosine function. Generally, the formula detection engine 100 uses keywords that do not have meaning in normal language (e.g., "tan"). In various embodiments, the fonts used to identify formula seeds include, but are not limited to, some or all of the following fonts: Cambria® Math, Computer Modern math Italic (cmmi), Computer Modern math bold Italic (cmmib), Computer Modern math extension (cmex), Computer Modern math symbols (cmsy), Computer Modern bold math symbols (cmbsy), American Math Society extra math symbols—first series (masm), American Math Society extra math symbols—second series (msbm), the extended set of integrals for Computer Modern (esint), MathTime TeX math italic (mtmi), MathTime TeX math symbols (mtsy), MathTime TeX math extension (mtex), and Roland Waldi's symbols (wasy). In some embodiments, the formula seeds include, but are not limited to, some or all of the Unicode characters or character sets in the ranges of 2200-22FF (mathematical operators), 27C0-27EF (miscellaneous mathematical symbols-A), 2980-29FF (miscellaneous mathematical symbols-B), and 2A00-2AFF (supplemental mathematical operators) as formula seeds. In various embodiments, the formula seeds include, but are not limited to, some or all of the following textual keywords: det, sin, cos, tg, tan, ctg, ctan, sinh, cosh, tanh, ctanh, log, ln, gcd, arcsin, arcos, arctan, sec, csc, max, min, inf, sup, lim, sgn, exp, mod, and var.

Once the formula seeds are identified, the formula detection engine 100 defines 404 a formula area (i.e., a boundary) around each of the detected formula seeds. Next, the formula detection engine 100 expands 406 the boundaries around the formula seeds to create the initial formula areas. In one embodiment, the adds all of the page elements in the vicinity of a formula seed that have properties of mathematical elements, until there are no such elements remaining. To decide whether or not a page element should be included in the formula area, the formula detection engine 100 looks for properties identifying the page element as a potential mathematical formula element. In various embodiments, the formula detection engine 100 considers properties including, but not limited to, the Euclidean distance from the formula area to the page element, the text font of the page element, the presence of mathematical operators, symbols, and/or numeric characters (i.e., digits) in the page element, and the dimensions of the page element (i.e., is it taller or wider than standard textual elements). All of the page elements enclosed by the bounding box of the formula area are deemed to be the captured elements.

Figure 5A:
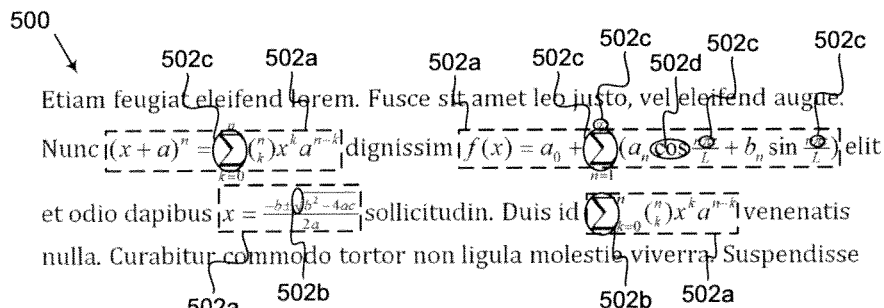
FIG. 5A graphically illustrates an exemplary operation of identifying formula seeds applied to a selected portion of the data parsed from a fixed format document that contains several mathematical formulas and equations appearing within a run of normal text.

FIG. 5A graphically illustrates a selected portion of the data 500 parsed from a fixed format document with examples of the formula seeds 502*a-d* identified by the formula detection engine 100. The formula seeds identified by font 502*a* are enclosed with broken line rectangles, and the formula seeds identified by mathematical operators 502*b*, symbols 502*c*, and keywords 502*d* are enclosed with solid line ovals.

Figure 5B:
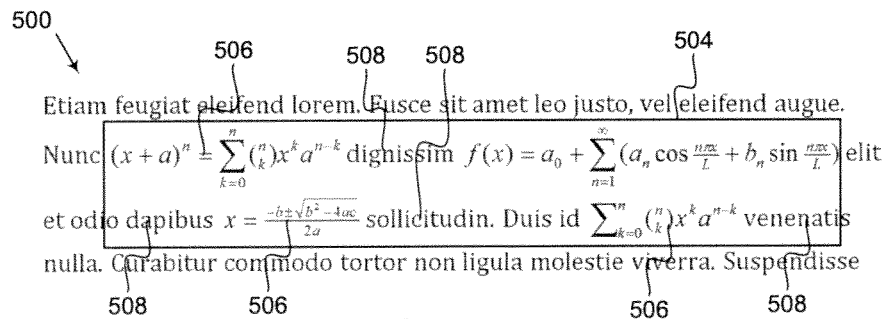
FIG. 5B graphically illustrates an exemplary operation from one embodiment of the process of creating the initial formula areas.

FIG. 5B graphically illustrates the initial formula area 504 created by the formula detection engine 100 delineated by a bounding box. In the illustrated embodiment, the result is a formula area bounded by rectangles that contain one or more mathematical formulas. Where the mathematical formulas are sufficiently separated from each other, each formula area will capture a single mathematical formula; however, in cases where multiple mathematical formulas are in close proximity, separate mathematical formulas may be captured in a single formula area. Moreover, when more than one formula is captured in a single formula area, the expanded formula area may overlap the surrounding normal text. In the illustrated embodiment, the expanded formula area has captured multiple mathematical formulas 506 and overlaps normal text 508 surrounding the mathematical formulas.

Figure 6:
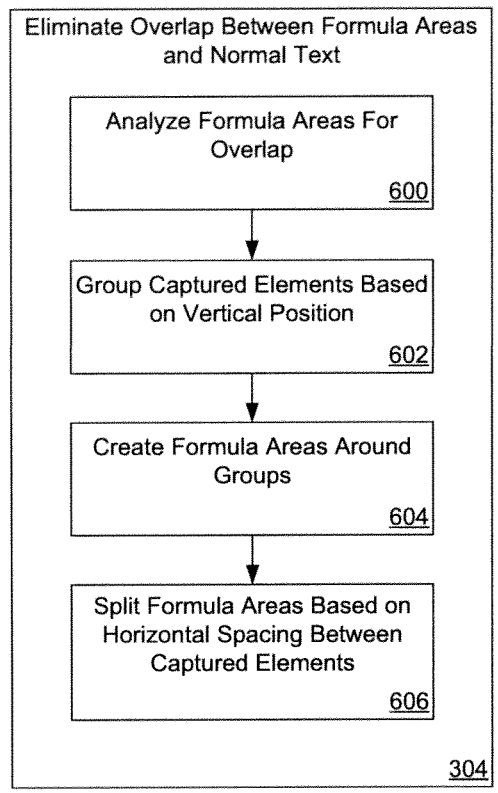
FIG. 6 is a flow chart showing one embodiment of the process for eliminating overlap between the formula areas and normal text used in the formula detection method.

FIG. 6 is a flow diagram showing one embodiment of the process of eliminating 304 overlap between formula areas and normal text used in the formula detection method 300. The formula detection engine 100 begins by analyzing 600 each formula area to determine whether or not the formula area overlaps any areas of normal text. If the formula area overlaps any normal text, the formula detection engine 100 continues by grouping 602 each captured element based on the vertical position of the captured element. A new formula area is created 604 around each new grouping of captured elements. The formula detection engine 100 analyzes the contents of new formula areas for overlap with normal text, and, any new formula area containing normal text are further divided. Iteratively analyzing, splitting, and reducing each new formula area, as necessary, allows formula detection engine 100 to handle cases where a formula area overlaps multiple lines of text. Once the formula areas are vertically grouped, the formula detection engine 100 continues by splitting 606 each formula area according to horizontal spacing between the captured elements.

Figure 7A:
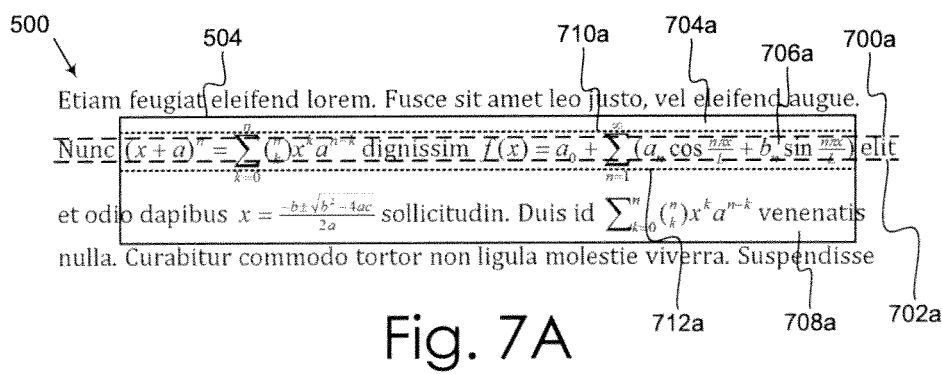
FIGS. 7A-D graphically illustrate selected exemplary operations from one embodiment of the process of eliminating overlap between formula areas and normal text used in one embodiment of the formula detection method.

FIGS. 7A-D graphically illustrate the subprocess of eliminating 304 overlap between formula areas and normal text used in the formula detection method 300 applied to the initial formula area 504. FIG. 7A shows the initial formula area 504 divided by two horizontal dividers 700*a*, 702*a* used to group the captured elements of the initial formula area 504 based on vertical position. The horizontal lines 700*a*, 702*a* correspond to the height of a line of normal text. The first horizontal line 700*a* corresponds to the top edge (i.e., border) of the box bounding the line of normal text containing the mathematical formula. The second horizontal line 702*a* corresponds to the bottom edge of the box bounding the line of normal text containing the mathematical formulas.

The dividers 700*a*, 702*a* divide the initial formula area 504 an upper region 704*a*, a middle region 706*a*, and a lower region 708*a*, which correspond to the areas above, in-line with, and below the line of normal text. If one of the primary dividers 700*a*, 702*a* intersects captured elements, the formula detection engine 100 establishes a secondary upper horizontal dividing line 710*a* and a secondary lower horizontal dividing line 712a, as necessary, above and below the highest and lowest positions of the intersected captured elements. It should be appreciated by those skilled in the art that the secondary dividers 710a, 712a need not be established if the primary dividers 700a, 702a do not intersect any captured elements. Alternatively, the secondary dividers 710a, 712a may be collinear with the primary dividers 700a, 702a.

Only those captured elements that lie completely above the topmost dividing line 700a, 710a established by the formula detection engine 100 are placed in a first group corresponding to the upper region 704a. In the illustrated embodiment, only the symbols "n" and "∞" fall into the first group. Similarly, only those captured elements that lie completely below the bottommost dividing line 702a, 712a established by the formula detection engine 100 are placed in a second group corresponding to the lower region 708a. In the illustrated embodiment, the terms "k=0" and "n=1" and the text, equations, and formulas in the line below those terms become part of the second group. All of the captured elements that do not fall into either of the first group or the second group are placed into a third group corresponding to the middle region 706a. In other words, the third group contains the captured elements that lie completely between the primary dividers 700a, 702a, are intersected by one or both of the primary dividers 700a, 702a, or vertically overlap an intersected captured element. Any empty groups are discarded.

Figure 7B:
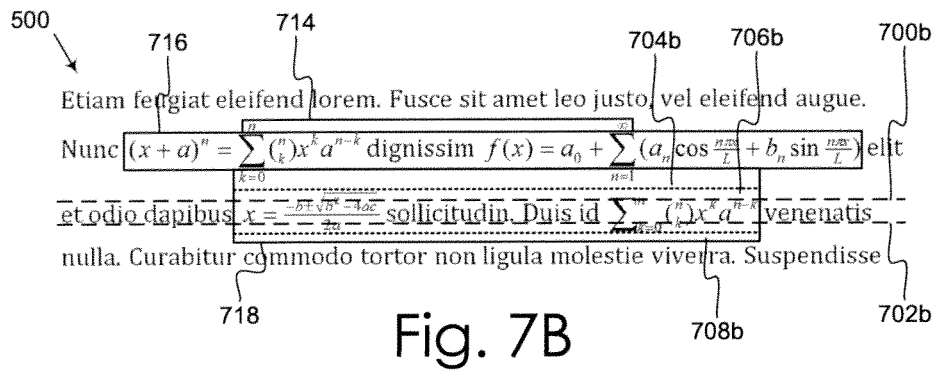

FIG. 7B illustrates the operation of creating 604 new formula areas around the groups based on the vertical position of the captured elements. Up to three new formula areas are created from the initial formula area 504. The formula detection engine 100 optionally reduces the dimensions of each new formula area to a suitable extent sufficient to enclose all formula elements captured therein. In the illustrated embodiment, the initial formula area 504 has been subdivided into three new formula areas 714, 716, and 718 and the initial formula area 500 has been discarded. Each of the new formula areas 714, 716, and 718 is subjected to the overlap identification operation 600. In the illustrated embodiment, the two uppermost new formula areas 714, 716 do not require any further vertical division. The third new formula area 718 still contains vertical overlap between formula areas and normal text. Accordingly, the formula detection engine 100 repeats the grouping by vertical position operation 602 and the new formula area creation operation 604 on the third new formula area 718. The lower dividing line 702b intersects the summation operator, and the upper dividing line 700b intersects both the square root operator and the summation operator. Note that the secondary upper divider 710b is established above the tallest intersected captured element (i.e., the square root operator). As before, the dividers 700b, 702b split the formula area 718 into the upper region 704b, the middle region 706b, and the lower region 708b. The formula detection engine 100 regroups the captured elements in the formula region 718 in the manner described above.

Figure 7C:
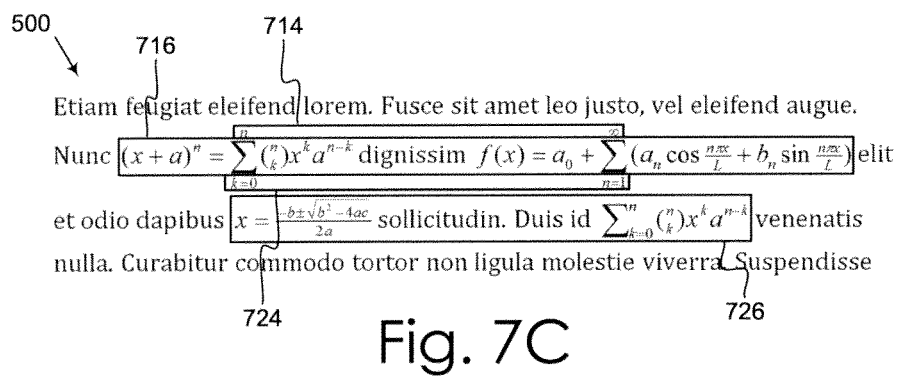

FIG. 7C illustrates the final result of the iterative application of the overlap identification operation 600, the grouping by vertical position operation 602, and the new formula area creation operation 604. The third new formula region 718 has been divided into two new formula areas 724, 726. The first formula area 724 corresponds to the upper region 704b of the formula region 718, and the second formula area 726 corresponds to the middle region 706b of the formula region 718. The empty group corresponding to the middle region 706b of the formula region 718 has been discarded. Neither of the remaining formula areas 724, 726 require any further vertical grouping.

Figure 7D:
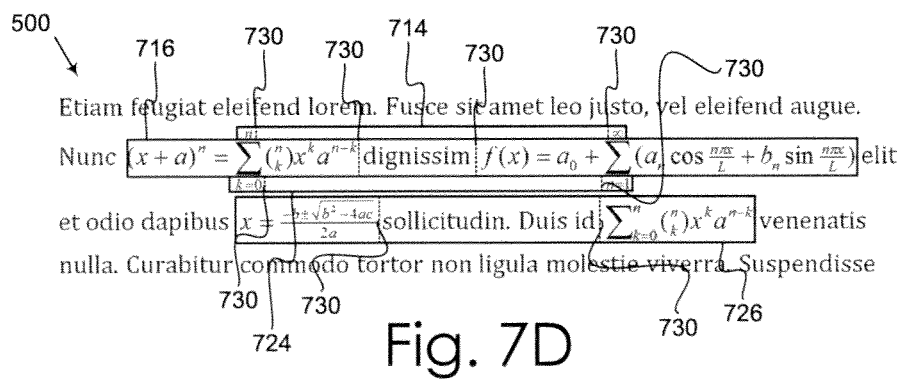

FIG. 7D illustrates the operation of splitting 606 the formula areas based on the horizontal spacing between captured elements. The formula detection engine 100 begins by horizontally scanning each formula area and determining the horizontal distance between each pair of consecutive captured elements in a formula area. In some embodiments, the horizontal scan direction corresponds to the reading direction of the document language. In other embodiments, the horizontal scan direction is left to right or right to left regardless of the document language. The formula detection engine 100 divides the formula area between two consecutive captured elements separated by a horizontal distance greater than a selected threshold distance to create new formula areas. In various embodiments, the horizontal distance between consecutive captured elements is determined from the whitespace. The dotted break lines 730 shown in FIG. 7D indicate where the horizontal separation exceeds the selected threshold. In some embodiments, a single threshold is used. In other embodiments, the threshold varies based on the surrounding text.

Figure 8:
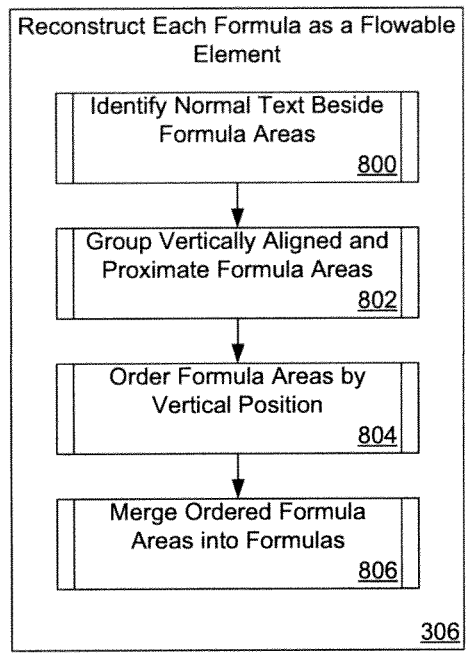
FIG. 8 is a flow diagram showing one embodiment of the process of reconstructing the individual formulas used in the formula detection method.

FIG. 8 is a flow diagram showing one embodiment of the subprocess of reconstructing 306 the individual formulas by grouping the formula boxes. The formula detection engine 100 begins by locating 800 the normal text elements appearing to the left and the right of each formula area. The formula detection engine 100 uses the information about the positions of the neighboring text elements to prevent merging of formula areas appearing in different lines on a page. The formula detection engine 100 then generates sets of merge candidates from the available formula areas. Formula areas that overlap horizontally (i.e., are at least partially vertically aligned) and are within a selected vertical separation distance are grouped 802 as merge candidates. The formula detection engine orders (e.g., sorts) 804 the merge candidates according to the vertical distance between the formula areas. In some embodiments, the merge candidates are sorted in ascending order. In other embodiments, the merge candidates are sorted in descending order. Working through the sorted merge candidates from first to last, the formula detection engine 100 replaces 806 two formula areas making up the merge candidate with a new formula area, provided that the two formula areas have not already been merged into a single formula area and their vertical positions are not associated with the vertical positions of separate lines. In some embodiments, whether or not the formula areas are in the same line on the page is determined from the normal text to the right and/or left of each formula area. If the normal text to the right or left of each formula area is the same, the formula areas are determined to be located within the same line on the page. Conversely, a difference in the normal text to the right or left of the formula areas indicates that the formula areas are located in different lines on the page. The boundary of the merged formula area is defined by the maximum extents of the two formula areas making up the merge candidate. In other words, the new formula area is defined by selecting the topmost, bottommost, leftmost, and rightmost boundary from the top, bottom, left, and right boundaries of the merge candidates.

Figure 9A:
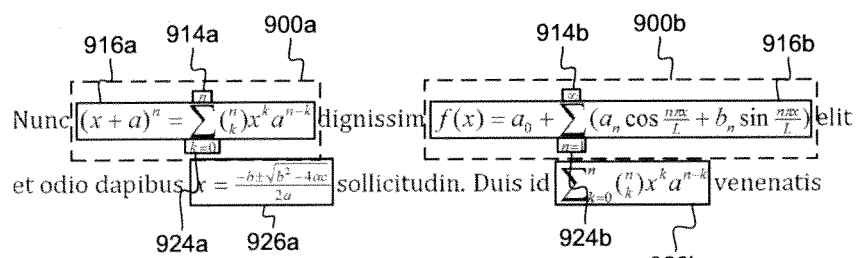
FIGS. 9A-B graphically illustrate selected exemplary operations from one embodiment of the process of reconstructing the individual formulas used in the formula detection method.
Figure 9B:
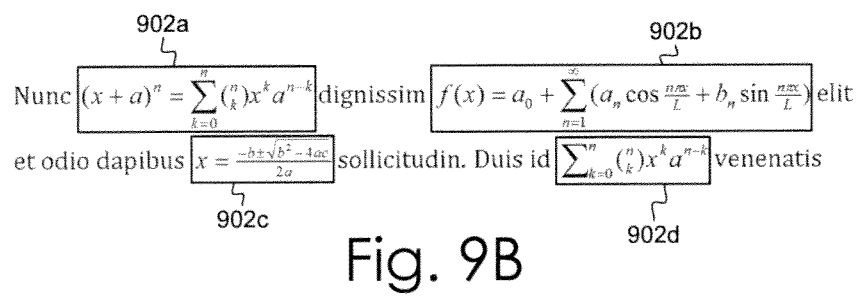

FIGS. 9A and 9B graphically illustrate selected operations from the subprocess of reconstructing 306 the individual formulas applied to the text run 500. FIG. 9A shows selected formulas areas grouped into merge candidates. The first merge candidate group 900a includes formula areas 914a, 916a, and 924a. The second merge candidate group 900b includes formula areas 914b, 916b, and 924b. Formula areas 924a and 924b are not merge candidates with formula areas 926a and 926b, respectively, because the vertical separation distance exceeds the selected threshold. Additionally, formula areas 926a and 926b are not merged with merge groups 900a and 900b, respectively, because the normal text to the left and right differ between them (i.e., the formula areas are in different lines on the page). FIG. 9B shows the final solution with each of the four formulas 902a-d properly separated from each other and from the surrounding normal text.

As used herein, the terms "area," "boundary," "box," are used interchangeably. Similarly, the terms "line" and "divider" are used interchangeably. It should be appreciated by those skilled in the art that the boundaries and dividers described herein need not be actually visually represented and/or displayed during the formula detection method. Additionally, the boundaries and dividers are not limited to boxes or lines. The boundaries and dividers may take other shapes (e.g., curves) without departing from the scope and spirit of the present invention. Moreover, the boundaries and dividers simply using coordinates or other reference systems. Terms connoting shapes (e.g., rectangle, box, line, and oval) should not be construed as limiting and should be read broadly as encompassing any suitable boundary or divider, as appropriate, unless the specification expressly indicates otherwise.

The formula detection engine and associated formula detection method described herein is useful to identify each distinct mathematical formula appearing in a fixed format document and to convert each identified mathematical formula into a flow format element. In various embodiments, the output of the formula detection engine is further processed by additional formatting engines within the document processor prior to being serialized.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

Figure 10:
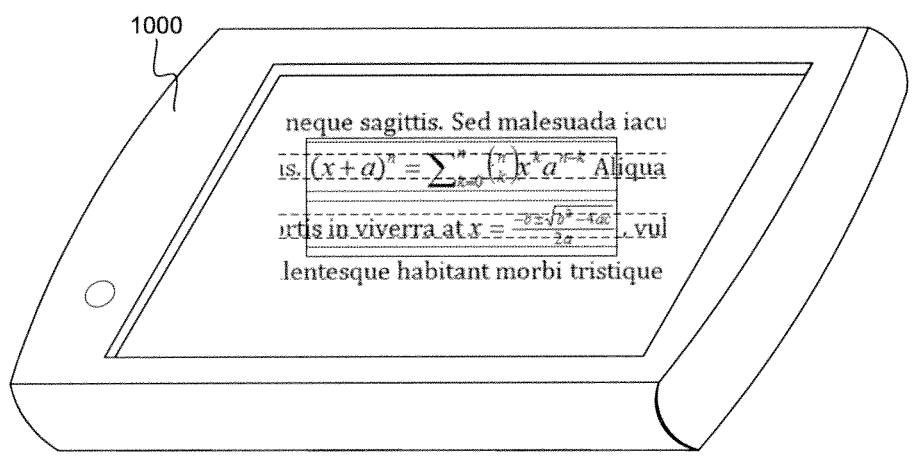
FIG. 10 illustrates an exemplary tablet computing device executing an embodiment of the formula detection engine.
Figure 11:
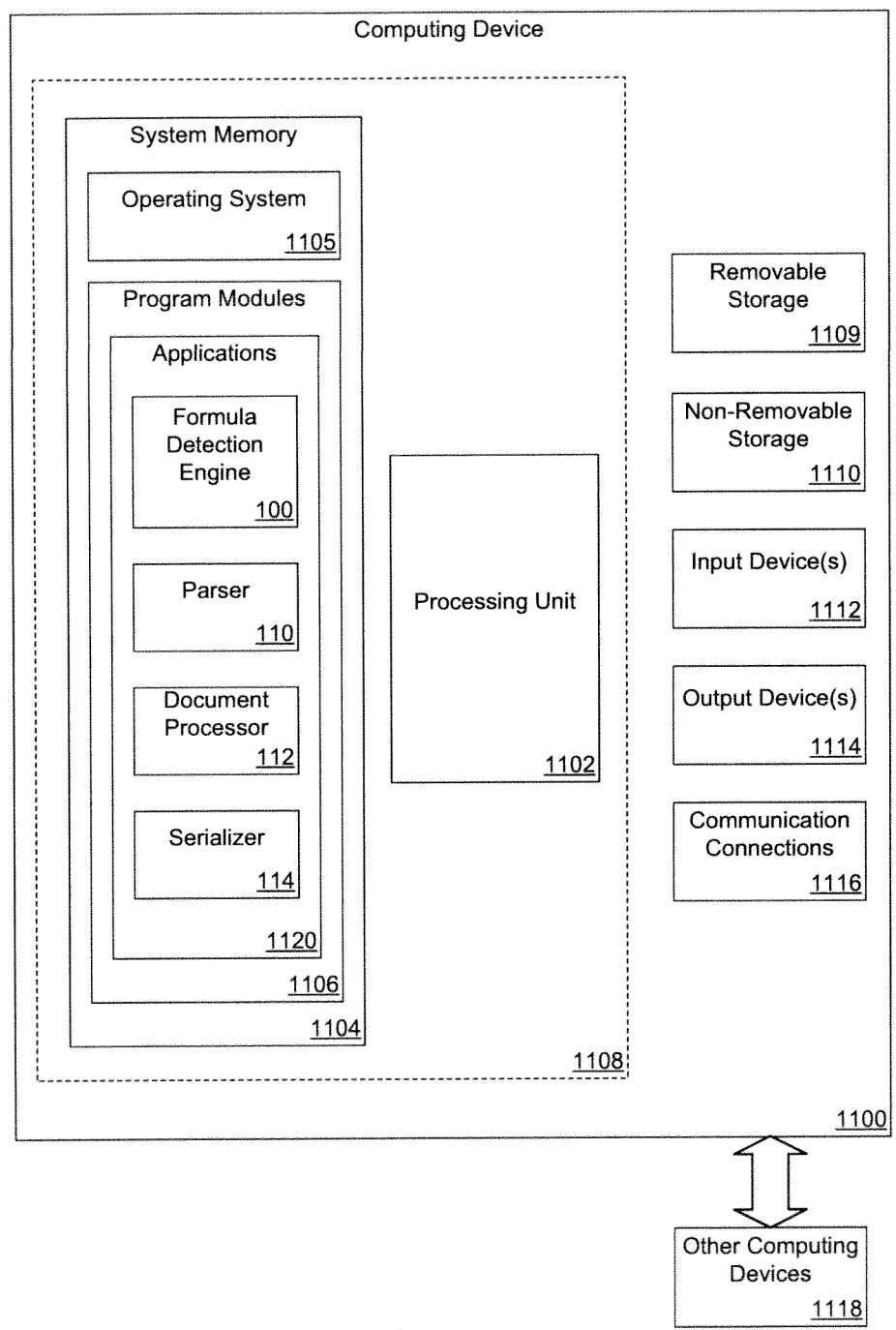
FIG. 11 is a simplified block diagram of an exemplary computing device suitable for practicing embodiments of the formula detection engine.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. FIG. 10 illustrates an exemplary tablet computing device 1000 executing an embodiment of the formula detection engine 100. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 11 through 13 and the associated descriptions provide a discussion of a variety of operating environments in which embodiments of the invention may be practiced. However, the devices and systems illustrated and discussed with respect to FIGS. 11 through 13 are for purposes of example and illustration and are not limiting of a vast number of computing device configurations that may be utilized for practicing embodiments of the invention, described herein.

FIG. 11 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the formula detection engine 100, the parser 110, the document converter 112, and the serializer 114. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106, such as the formula detection engine 100, the parser 110, the document processor 112, and the serializer 114 may perform processes including, for example, one or more of the stages of the formula detection method 300. The aforementioned process is an example, and the processing unit 1102 may perform other processes. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the formula detection engine 100, the parser 110, the document processor 112, and the serializer 114 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 1104, the removable storage device 1109, and the non-removable storage device 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 1100. Any such computer storage media may be part of the computing device 1100.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
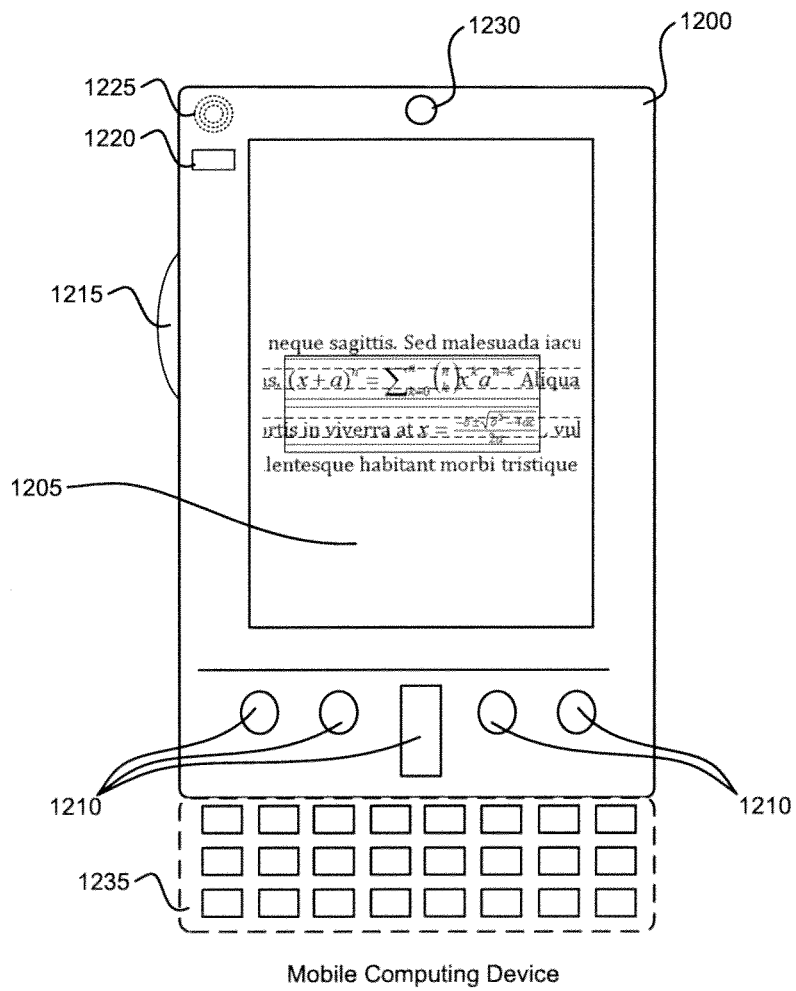
FIG. 12A illustrates one embodiment of a mobile computing device executing one embodiment of the formula detection engine.
Figure 12B:
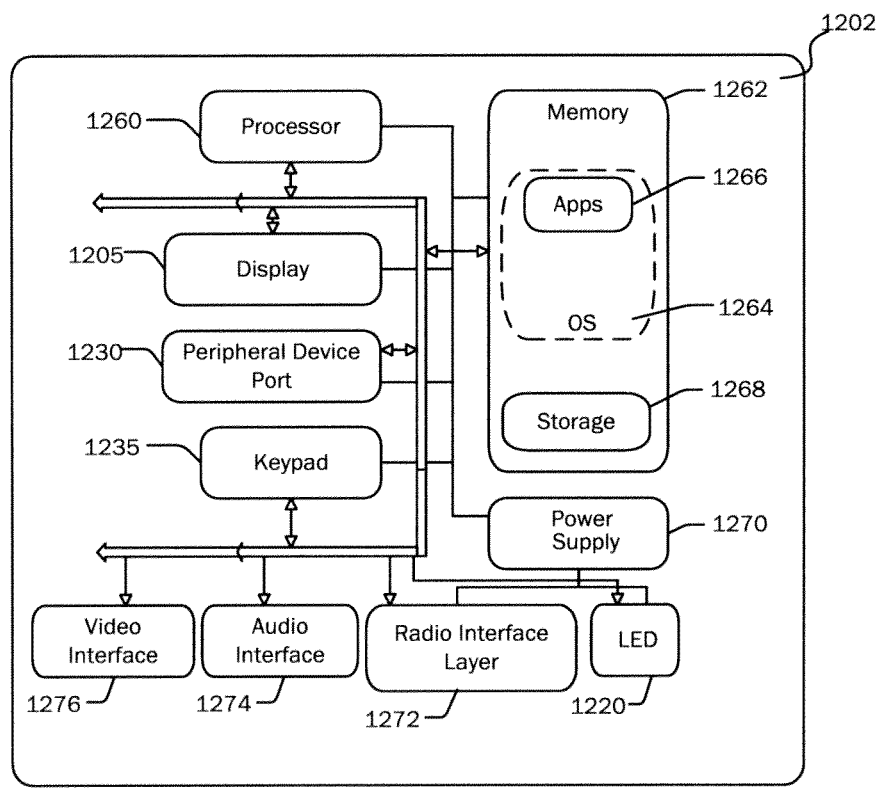
FIG. 12B is a simplified block diagram of an exemplary mobile computing device suitable for practicing embodiments of the formula detection engine.
Figure 13:
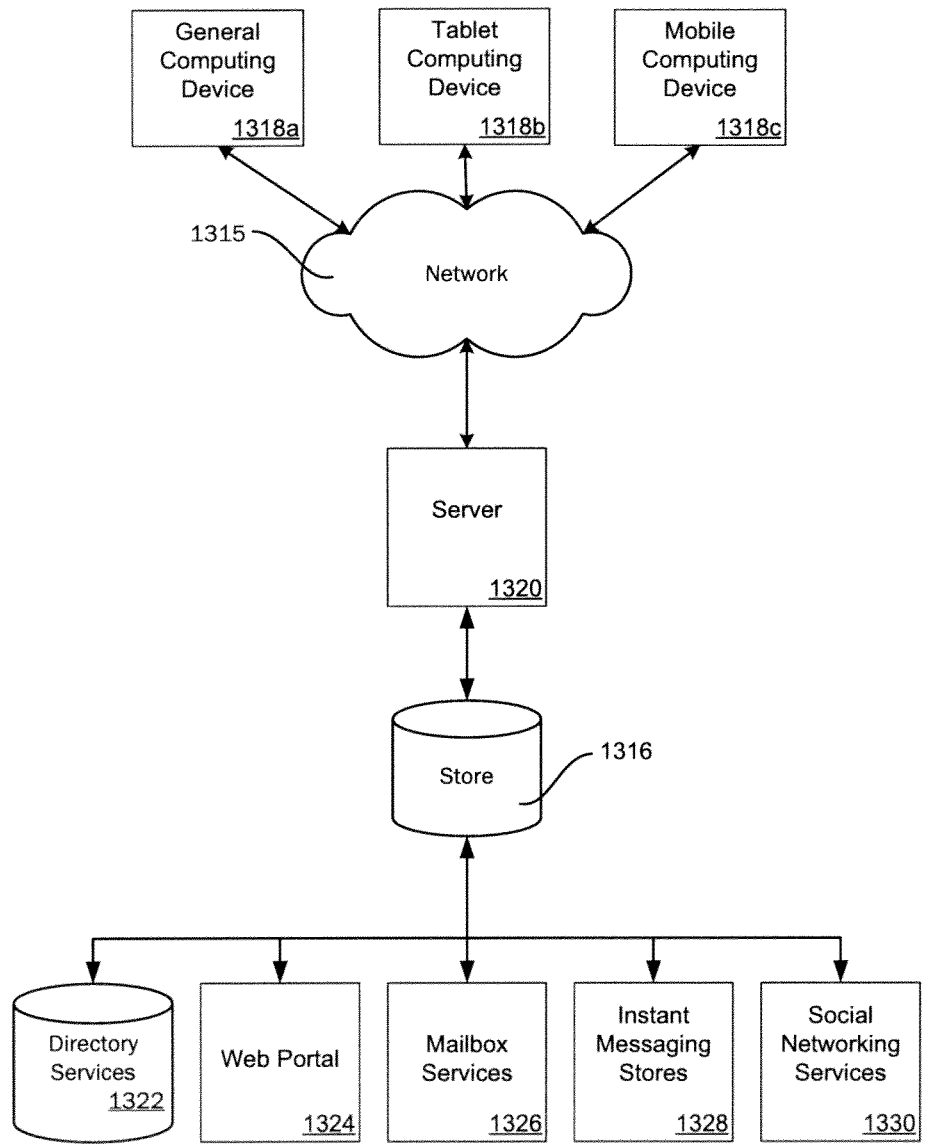
FIG. 13 is a simplified block diagram of an exemplary distributed computing system suitable for practicing embodiments of the formula detection engine.

FIGS. 12A and 12B illustrate a mobile computing device 1200, for example, a mobile telephone, a smart phone, a tablet personal computer, a laptop computer, and the like, with which embodiments of the invention may be practiced. With reference to FIG. 12A, an exemplary mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one embodiment of a mobile computing device. That is, the mobile computing device 1200 can incorporate a system (i.e., an architecture) 1202 to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the formula detection engine 100, the parser 110, the document processor 112, and the serializer 114 described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world", via a communications carrier or service provider. Transmissions to and from the radio 1272 are conducted under control of the operating system 1264. In other words, communications received by the radio 1272 may be disseminated to the application programs 1266 via the operating system 1264, and vice versa.

The radio 1272 allows the system 1202 to communicate with other computing devices, such as over a network. The radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 1202 provides notifications using the visual indicator 1220 that can be used to provide visual notifications and/or an audio interface 1274 producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268. Computer storage media may include volatile and nonvolatile, removable and non-removable media implemented in any method or technology for storage of information, such as computer readable instructions, data structures, program modules, or other data.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 13 illustrates one embodiment of the architecture of a system for providing the formula detection engine 100, the parser 110, the document processor 112, and the serializer 114 to one or more client devices, as described above. Content developed, interacted with or edited in association with the formula detection engine 100, the parser 110, the document processor 112, and the serializer 114 may be stored in different communication channels or other storage types. For example, various documents may be stored using a directory service 1322, a web portal 1324, a mailbox service 1326, an instant messaging store 1328, or a social networking site 1330. The formula detection engine 100, the parser 110, the document processor 112, and the serializer 114 may use any of these types of systems or the like for enabling data utilization, as described herein. A server 1320 may provide the formula detection engine 100, the parser 110, the document processor 112, and the serializer 114 to clients. As one example, the server 1320 may be a web server providing the formula detection engine 100, the parser 110, the document processor 112, and the serializer 114 over the web. The server 1320 may provide the formula detection engine 100, the parser 110, the document processor 112, and the serializer 114 over the web to clients through a network 1315. By way of example, the client computing device 1318 may be implemented as the computing device 1100 and embodied in a personal computer 1318a, a tablet computing device 1318b and/or a mobile computing device 1318c (e.g., a smart phone). Any of these embodiments of the client computing device 1318 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

What is claimed is:

1. A method for converting a fixed format document containing a formula into a flow format document, the method comprising the acts of:
    detecting a formula seed of a formula in data parsed from a page of a fixed format document, wherein the formula seed comprises a text element that carries an indication of being part of a formula;
    creating a formula area bounding the detected formula seed;
    expanding the formula area to include one or more mathematical elements that are detected on the page based on a proximity to the detected formula seed, wherein together the detected formula seed and the included one or more mathematical elements comprise a plurality of captured elements;
    placing the plurality of captured elements into one or more groups based on a vertical position of the plurality of captured elements relative to a line of normal text that overlaps the formula area;
    creating a new formula area around each of the one or more groups;
    splitting each new formula area based on a horizontal spacing between the captured elements in the new formula area;
    selecting a set of split formula areas based on an overlap of the split formula areas; and
    merging the split formula areas within the set into a single formula for display on a single line of a page of a flow format document.

2. The method of claim 1 characterized in that the act of detecting a formula seed in a fixed format document further comprises the act of detecting at least one of a mathematical keyword, a mathematical symbol, and a mathematical operator in the fixed format document.

3. The method of claim 2 characterized in that the act of detecting a formula seed in a fixed format document further comprises the act of detecting text proximate to at least one of the mathematical keyword, the mathematical symbol, and the mathematical operator as being within the formula area.

4. The method of claim 3 characterized in that the act of detecting text proximate to at least one of the mathematical keyword, the mathematical symbol, and the mathematical operator as being within the formula area further comprises the act of detecting text as being within the formula area based on the relative position of the text to at least one of the mathematical keyword, the mathematical symbol, and the mathematical operator.

5. The method of claim 1 characterized in that the act of detecting a formula seed in a fixed format document further comprises the act of detecting text in the fixed format document rendered in a mathematical font.

6. The method of claim 1, wherein selecting the set of split formula areas is further based on a vertical position of each of the split formula areas.

7. The method of claim 6, wherein selecting the set of split formula areas further comprises placing split formula areas in the set when a vertical separation distance between two successively ordered split formula areas does not exceed a selected distance threshold.

8. The method of claim 1, wherein the horizontal spacing between the captured element in the new formula area is based on a selected distance threshold.

9. The method of claim 8, wherein the selected distance threshold varies based on a type of the one or more mathematical elements.

10. The method of claim 1, wherein selecting a set of split formula areas is based on a horizontal overlap of the split formula areas.

11. A system for converting a fixed format document containing a mathematical formula into a flow format document, the system comprising:
    a document processor; and
    a memory including computer executable instructions which, when executed by a computer, is operable to:
        detect the mathematical formula in the fixed format document;
        convert fixed format elements making up the mathematical formula into flow format elements arranged to substantially preserve the meaning of the mathematical formula, comprising steps to:
            detect a formula seed of a formula in data parsed from a page of a fixed format document, the formula seed comprising a text element that carries an indication of being part of a formula;
            create a formula area bounding the detected formula seed;
            expand the formula area to include one or more mathematical elements that are detected on the page based on a proximity to the detected formula seed, wherein together the detected formula seed and the included one or more mathematical elements comprise a plurality of captured elements;
place the plurality of captured elements into one or more groups based on a vertical position of the plurality of captured elements relative to a horizontal position of a line of normal text on the page that overlaps the formula area;
create a new formula area around each of the one or more groups;
split each new formula area based on a horizontal spacing between the captured elements in the new formula area;
select a set of split formula areas based on an overlap of the split formula areas; and
merge the split formula area within the set into a single formula for display on a single line of a page of a flow format document.

12. The system of claim 11 characterized in that the document processor is further operable to detect at least one of a mathematical keyword, a mathematical symbol, and a mathematical operator in the fixed format document.

13. The system of claim 11 characterized in that the document processor is further operable to detect the fixed format elements corresponding to the mathematical formula based on the relative position of one of the fixed format elements to at least one of the mathematical keyword, the mathematical symbol, the mathematical operator, and another of the fixed format elements.

14. The system of claim 11 characterized in that the document processor is further operable to detect a mathematical font in the fixed format document.

15. The system of claim 14 characterized in that the document processor is further operable to detect fixed format elements rendered in the mathematical font.

16. The system of claim 11 characterized in that the document processor is further operable to detect the fixed format elements corresponding to the mathematical formula based on the relative positions of the fixed format elements.

17. The system of claim 11 characterized in that the document processor is further operable to group the fixed format elements based on the vertical position of the fixed format elements relative to a reference position within a formula area containing the mathematical formula.

18. The system of claim 11 characterized in that the document processor is further operable to:
detect a line of text aligned with the mathematical formula; and
group the fixed format elements based on the offsets of the fixed format elements relative to the position of the line of text.

19. A hardware computer storage media containing computer executable instructions which, when executed by a computer, perform a method of converting a fixed format document containing a mathematical formula into a flow format document, the method comprising the acts of:
opening the fixed format document containing the mathematical formula;
detecting a formula seed of a formula in data parsed from a page of the fixed format document, wherein the formula seed comprises a text element that carries an indication of being part of the mathematical formula;
creating a formula area bounding the detected formula seed;
expanding the formula area to include one or more mathematical elements that are detected on the page based on a proximity to the detected formula seed, wherein together the detected formula seed and the included one or more mathematical elements comprise a plurality of captured elements;
placing the plurality of captured elements into one or more groups based on a vertical position of the plurality of captured elements relative to a line of normal text that overlaps the formula area;
creating a new formula area around each of the one or more groups;
splitting each new formula area based on a horizontal spacing between the captured elements in the new formula area;
selecting a set of split formula area based on an overlap of the split formula areas; and
merging the split formula areas within the set into a single formula for display on a single line of a page of a flow format document.

20. The hardware computer storage media of claim 19 characterized in that the act of detecting fixed format elements corresponding to the mathematical formula further comprises the acts of:
detecting at least one of a math symbol, a math operator, a math keyword, and a math font in the fixed format document; and
identifying the fixed format elements proximate to at least one of a math symbol, a math operator, and a math keyword in the fixed format document as being within a formula area; and
identifying the fixed format elements rendered in the mathematical font as being within the formula area.

21. The hardware computer storage media of claim 20 characterized in that the act of detecting the fixed format elements corresponding to the mathematical formula further comprises the act of identifying the fixed format elements in the formula area that are at least partially horizontally aligned with another fixed format element in the formula area as corresponding to the mathematical formula.

* * * * *